UNITED STATES PATENT OFFICE.

WARREN A. PATTERSON, OF DALLAS, TEXAS, ASSIGNOR OF THREE-FIFTHS TO JOSEPH A. SOLOMON, OF NEW YORK, N. Y., AND MERIDETH A. SULLIVAN, CHARLES L. SANGER, DANIEL WEIL, ALEXANDER WEIL, AND DANIEL WISE, OF WACO, TEXAS.

COMPOSITION FUEL.

SPECIFICATION forming part of Letters Patent No. 665,974, dated January 15, 1901.

Application filed July 16, 1900. Serial No. 23,747. (No specimens.)

*To all whom it may concern:*

Be it known that I, WARREN A. PATTERSON, a citizen of the United States, residing at the city of Dallas, county of Dallas, State of Texas, have invented a certain new and useful Improvement in Composition Fuel, of which the following is a full, clear, and exact description, such as will enable others skilled in the art to which it appertains to make and use the same.

This invention relates to a new and useful improvement in composition fuel, the object being to produce fuel in compact form which will burn quickly, rapidly generating an intense heat, and leaving but a small quantity of a residue or ash.

With this object in view the invention consists in the composition of ingredients entering into the fuel in about the proportions hereinafter described and afterward pointed out in the claims.

The fuel is composed of solid and liquid ingredients, the former of which is preferably ground corncobs and the latter a compound in which resin is the principal ingredient, said resinous ingredient being mixed while in a heated state with the ground corncobs in about the proportions of one to three. In making this compound I take in volume about thirty-two parts resin and one part petroleum, and when the resin is subjected to heat and melted I introduce in volume two parts of some crystallizing substance—such, for instance, as cedar-tops or the ends of branches of cedar-trees, which are placed in the boiling resin in their natural state. The oil extracted from the cedar-tops assists in crystallizing the resin, when the same becomes congealed upon cooling and gives to the resin a glaze or finish which enables the fuel to be conveniently handled and packed. In an application filed of even date herewith and serially numbered 23,746 I have described the method of making such fuel. The pressed corncobs are subjected to pressure with the heated liquid compound, which in its fluid condition penetrates the pores of the pith and other portions of the cob, and when the fuel issues from the press and is allowed to cool the liquid compound congeals, the resin forming the principal ingredient thereof being made hard and having a glaze from the oil in the cedar-tops which is contained therein.

There may be other substances which may be employed in conjunction with the resin to give it the finish and glaze above described, and therefore I do not wish to be understood as limiting myself to the oil extracted from the cedar-tops; nor do I wish to be understood as limiting my invention to the use of petroleum, as the same may be omitted, if desired. However, the presence of the petroleum in the liquid compound causes the fuel to burn quickly and generate an intense heat.

Having thus described my invention, what I claim, and desire to secure by Letters Patent, is—

1. As a new article of manufacture, a composition fuel consisting of a solid inflammable ingredient and a mixture of resin, and oil of cedar-tops; substantially as described.

2. A composition fuel consisting of a solid ingredient combined with a mixture of resin, petroleum and oil of cedar-tops; substantially as described.

3. A composition fuel consisting of three parts corncob, and one part mixture of resin, petroleum, and oil of cedar-tops; substantially as described.

4. A composition fuel consisting of corncob and a mixture composed of thirty-two parts resin, two parts cedar-tops, and one part petroleum; substantially as described.

In testimony whereof I hereunto affix my signature, in the presence of two witnesses, this 11th day of July, 1900.

WARREN A. PATTERSON.

Witnesses:
WM. H. SCOTT,
A. S. GRAY.